Inventor

Herbert H. Kersten

Patented June 17, 1952

2,601,028

UNITED STATES PATENT OFFICE 2,601,028

DIFFERENTIAL THERMOSTAT WITH OPPOSING BIMETALLIC COILS AND PARTITION THEREBETWEEN

Herbert H. Kersten, Fort Dodge, Iowa

Application December 28, 1949, Serial No. 135,509

6 Claims. (Cl. 200—139)

This invention relates to new and useful improvements in thermostats and the primary object of the present invention is the provision of a novel and improved switch construction for controlling temperature regulating mechanisms in such a manner that a temperature differential between two spaces will actuate or de-actuate suitable control mechanisms.

Another important object of the present invention is to provide a switch embodying a stationary contact, a movable contact for completing a circuit upon engagement with the stationary contact and a pair of thermal responsive members for moving the movable contact relative to the stationary contact, said thermal responsive members being positioned in two spaces, such as two room areas, so that the thermal responsive members will respond to a predetermined temperature difference between the two room areas.

A further object of the present invention is to provide a differential thermostat adapted for the control of attic ventilating fans, the purpose of which is to maintain the temperature in attics at a level approximating outdoor temperatures. In such an application it is necessary, using customary installations, to control the fan operation by hand, thus causing unnecessary inconvenience, and often, inefficient cooling. An attic fan installation cannot cause the attic to become any cooler than the external temperature. Consequently, when the temperature within the attic had been reduced to within a few degrees of the temperature of the outside air, it would be advisable to cut off the fan, with a corresponding saving in power consumption. An ordinary thermostat would help but little in this situation, for the temperature of the outside air is subject to wide variation throughout any twenty-four hour period.

The present invention is constructed to automatically control an attic cooling fan, or other device, in response to an absolute temperature difference between the external temperature of the attic and the external air.

A still further aim of the present invention is to provide a thermostat that is extremely small and compact in structure, simple and practical in construction, strong and reliable in use, efficient and durable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part thereof, wherein like numerals refer to like parts throughout, and in which:

Figure 1:
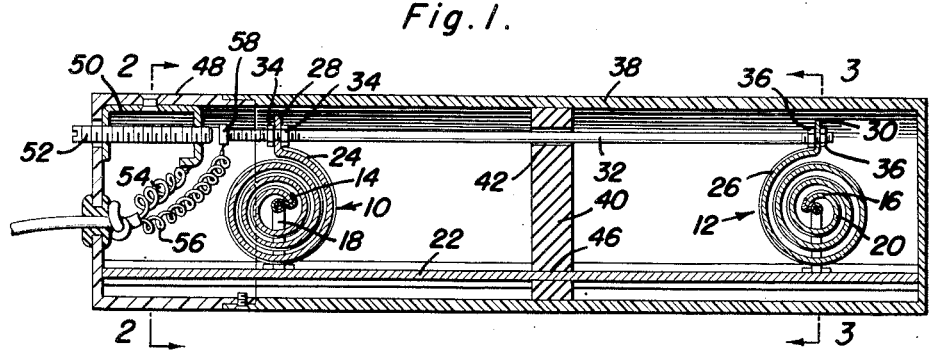
Figure 1 is a longitudinal sectional view through the center of the present invention.
Figure 2:
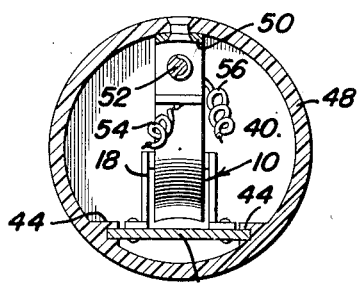
Figure 2 is a transverse vertical sectional view taken substantially on the plane of section line 2—2 of Figure 1.
Figure 3:
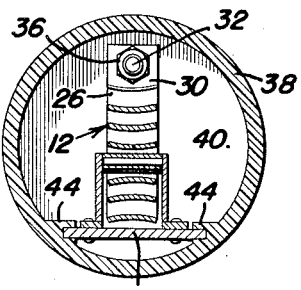
Figure 3 is a transverse vertical sectional view taken substantially on the plane of section line 3—3 of Figure 1.
Figure 4:
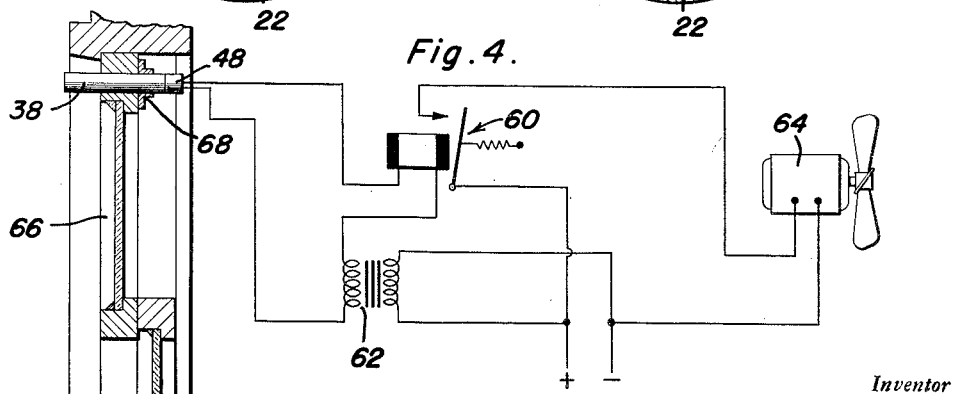
Figure 4 is a schematic view showing the circuit for the present invention and also illustrating the invention applied to an attic window and connected to a fan.

Referring now to the drawings in detail, wherein for the purpose of illustration, there is disclosed a preferred embodiment of the present invention, the numerals 10 and 12 represent a pair of convoluted or coiled mechanical thermometer units or thermal responsive members each composed of bands of different metals having differing coefficients of thermal expansion. The units are preferably identical to another in so far as it is practical to make them.

The members 10 and 12 include inner convolutions 14 and 16 respectively, that are attached to brackets 18 and 20 at the ends of an elongated platform 22. The members 10 and 12 are coiled oppositely with respect to each other so that their motions in response to similar temperature changes will be opposite in direction.

The outer convolutions or terminals 24 and 26 of the members 10 and 12 terminate in ears 28 and 30 that receive a switch member or conductive bar 32. Pairs of nuts 34 and 36 are threaded on the member 32 to adjust the ears 28 and 30 longitudinally on the member 32.

The platform 22 and the elements mounted thereon are positioned in a case 38 having a partition 40 disposed therein. The partition 40 includes an opening 42 slidably receiving the member 32. Guide tracks 44 integrally formed with the inner periphery of the case 38 slidably receive the side edges of the platform 22 and the partition 40 also includes a slot 46 in which the platform is secured.

The case 38 includes a removable end portion or cap 48 that holds a bracket 50. A contact member 52 is threaded on the bracket 50 and includes an end portion that projects from the case. A pair of conductive wires 54 and 56 are connected to the bracket 50 and a contact 58 on the rod 32.

The wires 54 and 56 are connected to a relay switch 60, a low voltage transformer 62 and an attic fan 64 by circuit wires, and the case 38 is mounted on an attic window sash 66 with a sealing ring 68. One end of the case extends outwardly from the window into the atmosphere and the other end of the case is positioned in the attic.

No motion of the rigid bar 32 will occur when both the thermometer coils 10 and 12 are heated or cooled at the same rate. When one of the coils is exposed to a temperature which differs from that about the paired coil, there will be a change in position of rigid bar 32 which can be utilized to make or break the circuit to the fan.

Obviously, the instant structure is applicable for various installations and is not to be restricted to the attic fan illustrated.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A differential thermostat comprising an elongated slidable switch member, a first convoluted thermal responsive member having one end detachably and adjustably connected to one end of said switch member for moving the switch member in response to temperature conditions in an area in which the first thermal responsive member is disposed, a second convoluted thermal responsive member having an end detachably and adjustably connected to the other end of said switch member for moving the switch member in response to temperature conditions in an area in which the second thermal responsive member is disposed, and a contact member for engaging the switch member upon predetermined movement of the switch member in one direction, each of said convoluted members being composed of a plurality of convolutions that are coplanar with each other.

2. A thermostat comprising a switch including a stationary contact and a slidable switch member, and a convoluted heat responsive member having coplanar inner and outer convolutions, a support attached to the inner convolution of said heat responsive member, the outer convolution of said heat responsive member being detachably and adjustably secured to said switch member for selectively moving the switch member toward and away from the contact in response to high and low temperature conditions adjacent the heat responsive member.

3. The combination of claim 2 wherein said heat responsive member is composed of two bands of metal having differing coefficients of thermal expansion.

4. A differential thermostat comprising an elongated case having a partition therein for dividing the case into two compartments, a contact member mounted in one of the compartments, a convoluted thermal responsive member in each of the compartments, each of said thermal responsive members having coplanar inner and outer convolutions, support means within the case attached to the inner convolutions of said thermal responsive members, and a bar slidably carried by the partition for movement relative to the contact member and terminally adjustably and removably secured to the outer convolutions of said thermal responsive members.

5. The combination of claim 4 wherein one of said thermal responsive members is coiled about itself in a clockwise direction and the outer of said thermal responsive members is coiled about itself in a counterclockwise direction.

6. A differential thermostat comprising an elongated slidable switch member, a first convoluted thermal responsive member having inner and outer convolutions, a second convoluted thermal responsive member having inner and outer convolutions, a pair of supports attached to the inner convolutions of said thermal responsive members, each of said members having a radially projecting ear at its outer convolution receiving the ends of said switch member, pairs of nuts threaded on the ends of said switch member and adjusting the ears longitudinally upon the switch member, and a contact member for engaging the switch member upon predetermined movement of the switch member in one direction.

HERBERT H. KERSTEN.

REFERENCES CITED

The following references are of record in the file of this patent:

UNITED STATES PATENTS

| Number | Name | Date |
|---|---|---|
| 1,435,894 | Halagarda | Nov. 14, 1922 |
| 1,894,842 | Appelberg | Jan. 17, 1933 |
| 2,043,834 | Marbury | June 9, 1936 |
| 2,306,810 | Jones | Dec. 29, 1942 |
| 2,335,100 | Bauer | Nov. 23, 1943 |
| 2,342,998 | Bieret | Feb. 29, 1944 |

FOREIGN PATENTS

| Number | Country | Date |
|---|---|---|
| 843,060 | France | Mar. 20, 1939 |